United States Patent
Miller et al.

(10) Patent No.: US 10,649,233 B2
(45) Date of Patent: May 12, 2020

(54) UNOBTRUSIVE EYE MOUNTED DISPLAY

(71) Applicant: Spy Eye, LLC, Los Gatos, CA (US)

(72) Inventors: Gregory David Miller, San Jose, CA (US); Brian Elliot Lemoff, Morgan Hill, CA (US); Kuang-mon Ashley Tuan, Mountain View, CA (US); Herbert John Kniess, San Jose, CA (US); Ion Opris, San Jose, CA (US); Michael West Wiemer, San Jose, CA (US); Drew Daniel Perkins, Saratoga, CA (US)

(73) Assignee: Tectus Corporation, Saratoga, CA (US)

(*) Notice: Subject to any disclaimer, the term of this patent is extended or adjusted under 35 U.S.C. 154(b) by 112 days.

(21) Appl. No.: 15/822,913

(22) Filed: Nov. 27, 2017

(65) Prior Publication Data

US 2018/0149884 A1    May 31, 2018

Related U.S. Application Data

(60) Provisional application No. 62/427,078, filed on Nov. 28, 2016.

(51) Int. Cl.
  *G02B 27/01*  (2006.01)
  *G03B 21/14*  (2006.01)
  (Continued)

(52) U.S. Cl.
  CPC .............. *G02C 7/04* (2013.01); *G02B 27/01* (2013.01); *G02B 27/017* (2013.01); *G03B 21/14* (2013.01);
  (Continued)

(58) Field of Classification Search
  CPC combination set(s) only.
  See application file for complete search history.

(56) References Cited

U.S. PATENT DOCUMENTS

| 4,871,247 A | 10/1989 | Haynes |
| 5,331,149 A | 7/1994 | Spitzer et al. |
(Continued)

FOREIGN PATENT DOCUMENTS

| CA | 2280022 | 1/2001 |
| WO | WO 2016/014118 | 1/2016 |
(Continued)

OTHER PUBLICATIONS

Kao, H-L. et al., "DuoSkin: Rapidly Prototyping On-Skin User Interfaces Using Skin-Friendly Materials," ISWC '16, ACM, Sep. 12-16, 2016, 8 pages.
(Continued)

*Primary Examiner* — Ganiyu A Hanidu
(74) *Attorney, Agent, or Firm* — Fenwick & West LLP

(57) ABSTRACT

An unobtrusive augmented reality (AR) system can be used to assist the wearer in every day interactions by projecting information from the contact lens display onto the retina of the wearer's eye. The unobtrusive augmented reality system includes a necklace and a contact lens display that are unobtrusive to the wearer and the wearer's surrounding environment. The necklace of the unobtrusive augmented reality system generates power and data for the contact lens displays. The necklace and contact lens display include conductive coils inductively coupled by a magnetic field. The inductive coupling allows data and power generated by the necklace to be transferred to the contact lens display. A projector in the contact lens display projects images generated from the data onto the retina of the wearers eye.

23 Claims, 13 Drawing Sheets

US 10,649,233 B2

Page 2

(51) Int. Cl.
  *H04B 5/00* (2006.01)
  *G02C 7/04* (2006.01)
  *A44C 15/00* (2006.01)
(52) U.S. Cl.
  CPC ......... *H04B 5/0031* (2013.01); *H04B 5/0037* (2013.01); *A44C 15/005* (2013.01); *G02B 2027/015* (2013.01); *G02B 2027/0152* (2013.01); *G03B 2206/00* (2013.01)

(56) References Cited

U.S. PATENT DOCUMENTS

| | | |
|---|---|---|
| 5,467,104 A | 11/1995 | Furness et al. |
| 5,638,218 A | 6/1997 | Oomura |
| 5,638,219 A | 6/1997 | Medina et al. |
| 5,682,210 A | 10/1997 | Weirich |
| 5,699,193 A | 12/1997 | Monno et al. |
| 5,712,721 A | 1/1998 | Large |
| 5,726,916 A | 3/1998 | Smyth |
| 6,120,460 A | 9/2000 | Abreu |
| 6,215,593 B1 | 4/2001 | Bruce |
| 6,307,945 B1 | 10/2001 | Hall |
| 6,312,393 B1 | 11/2001 | Abreu |
| 6,570,386 B2 | 5/2003 | Goldstein |
| 6,823,171 B1 | 11/2004 | Kaario |
| 6,851,805 B2 | 2/2005 | Blum et al. |
| 6,920,283 B2 | 7/2005 | Goldstein |
| 7,137,952 B2 | 11/2006 | Leonardi et al. |
| 7,359,059 B2 | 4/2008 | Lust et al. |
| 7,626,562 B2 | 12/2009 | Iwasaki |
| 7,758,187 B2 | 7/2010 | Amirparviz |
| 7,835,056 B2 | 11/2010 | Doucet et al. |
| 8,077,245 B2 | 12/2011 | Adamo et al. |
| 8,087,777 B2 | 1/2012 | Rosenthal |
| 8,096,654 B2 | 1/2012 | Amirparviz et al. |
| 8,348,422 B2 | 1/2013 | Pugh et al. |
| 8,348,424 B2 | 1/2013 | Pugh et al. |
| 8,394,660 B2 | 3/2013 | Kim et al. |
| 8,398,239 B2 | 3/2013 | Horning et al. |
| 8,430,310 B1 | 4/2013 | Ho et al. |
| 8,441,731 B2 | 5/2013 | Sprague |
| 8,446,341 B2 | 5/2013 | Amirparviz et al. |
| 8,482,858 B2 | 7/2013 | Sprague |
| 8,520,309 B2 | 8/2013 | Sprague |
| 8,526,879 B2 | 9/2013 | Kristiansen et al. |
| 8,579,434 B2 | 11/2013 | Amirparviz et al. |
| 8,582,209 B1 | 11/2013 | Amirparviz |
| 8,608,310 B2 | 12/2013 | Otis et al. |
| 8,632,182 B2 | 1/2014 | Chen et al. |
| 8,721,074 B2 | 5/2014 | Pugh et al. |
| 8,764,185 B1 | 7/2014 | Biederman et al. |
| 8,781,570 B2 | 7/2014 | Chuang et al. |
| 8,786,520 B2 | 7/2014 | Legerton et al. |
| 8,786,675 B2 | 7/2014 | Deering |
| 8,798,332 B2 | 8/2014 | Otis et al. |
| 8,827,445 B1 | 9/2014 | Wiser et al. |
| 8,830,571 B1 | 9/2014 | Vizgaitis |
| 8,870,370 B1 | 10/2014 | Otis et al. |
| 8,874,182 B2 | 10/2014 | Etzkorn et al. |
| 8,906,088 B2 | 12/2014 | Pugh et al. |
| 8,911,078 B2 | 12/2014 | Meyers |
| 8,922,898 B2 | 12/2014 | Legerton et al. |
| 8,931,906 B2 | 1/2015 | Huang et al. |
| 8,960,898 B1 | 2/2015 | Etzkorn et al. |
| 8,963,268 B2 | 2/2015 | Kim et al. |
| 8,964,298 B2 | 2/2015 | Haddick et al. |
| 8,971,978 B2 | 3/2015 | Ho et al. |
| 8,985,763 B1 | 3/2015 | Etzkorn et al. |
| 8,989,834 B2 | 3/2015 | Ho et al. |
| 9,000,000 B2 | 4/2015 | Carroll |
| 9,028,068 B2 | 5/2015 | Chang |
| 9,039,171 B2 | 5/2015 | Groisman |
| 9,040,923 B2 | 5/2015 | Sprague et al. |
| 9,047,512 B2 | 6/2015 | Otis et al. |
| 9,048,389 B2 | 6/2015 | Fu et al. |
| 9,052,528 B2 | 6/2015 | Pugh et al. |
| 9,052,533 B2 | 6/2015 | Pugh et al. |
| 9,054,079 B2 | 6/2015 | Etzkorn |
| 9,058,053 B2 | 6/2015 | Covington |
| 9,063,351 B1 | 6/2015 | Ho et al. |
| 9,063,352 B2 | 6/2015 | Ford et al. |
| 9,111,473 B1 | 8/2015 | Ho et al. |
| 9,130,099 B2 | 9/2015 | Robin |
| 9,130,122 B2 | 9/2015 | Fu et al. |
| 9,134,546 B2 | 9/2015 | Pugh et al. |
| 9,153,074 B2 | 10/2015 | Zhou et al. |
| 9,158,133 B1 | 10/2015 | Pletcher et al. |
| 9,161,712 B2 | 10/2015 | Etzkorn |
| 9,170,646 B2 | 10/2015 | Toner et al. |
| 9,178,107 B2 | 11/2015 | Tsai et al. |
| 9,192,298 B2 | 11/2015 | Bouwstra et al. |
| 9,195,075 B2 | 11/2015 | Pugh et al. |
| 9,196,094 B2 | 11/2015 | Ur |
| 9,215,293 B2 | 12/2015 | Miller |
| 9,217,881 B2 | 12/2015 | Pugh et al. |
| 9,225,375 B2 | 12/2015 | Pugh et al. |
| 9,244,285 B2 | 1/2016 | Chen et al. |
| 9,271,677 B2 | 3/2016 | Leonardi |
| 9,280,972 B2 | 3/2016 | McCulloch |
| 9,282,920 B2 | 3/2016 | Ho et al. |
| 9,289,123 B2 | 3/2016 | Weibel et al. |
| 9,289,954 B2 | 3/2016 | Linhardt et al. |
| 9,298,002 B2 | 3/2016 | Border et al. |
| 9,298,020 B1 | 3/2016 | Etzkorn et al. |
| D754,861 S | 4/2016 | O'Driscoll et al. |
| 9,307,905 B2 | 4/2016 | Varel et al. |
| 9,310,626 B2 | 4/2016 | Pugh et al. |
| 9,316,848 B2 | 4/2016 | Pugh et al. |
| 9,326,710 B1 | 5/2016 | Liu et al. |
| 9,332,935 B2 | 5/2016 | Etzkorn et al. |
| 9,335,562 B2 | 5/2016 | Pugh et al. |
| 9,341,843 B2 | 5/2016 | Border et al. |
| 9,366,872 B2 | 6/2016 | Honea et al. |
| 9,366,881 B2 | 6/2016 | Pugh et al. |
| 9,389,433 B2 | 7/2016 | Pugh et al. |
| 9,401,454 B2 | 7/2016 | Robin et al. |
| 9,414,746 B2 | 8/2016 | Bergman et al. |
| 9,425,359 B2 | 8/2016 | Tsai et al. |
| 9,442,307 B2 | 9/2016 | Meyers |
| 9,445,768 B2 | 9/2016 | Alexander et al. |
| 9,523,865 B2 | 12/2016 | Pletcher et al. |
| 9,639,774 B2 | 4/2017 | Dayal et al. |
| 9,728,981 B2 | 8/2017 | Lee |
| 9,884,180 B1 * | 2/2018 | Ho ...................... A61N 1/0543 |
| 2002/0158816 A1 | 10/2002 | Snider |
| 2006/0290882 A1 | 12/2006 | Meyers et al. |
| 2009/0066722 A1 | 3/2009 | Kriger et al. |
| 2010/0001926 A1 | 1/2010 | Amirparviz et al. |
| 2010/0234717 A1 | 9/2010 | Wismer et al. |
| 2011/0221659 A1 | 9/2011 | King et al. |
| 2012/0153894 A1 | 6/2012 | Widmer |
| 2013/0050432 A1 | 2/2013 | Perez et al. |
| 2013/0100139 A1 | 4/2013 | Schliesser et al. |
| 2013/0242077 A1 | 9/2013 | Lin et al. |
| 2013/0270664 A1 | 10/2013 | Kim et al. |
| 2014/0016097 A1 | 1/2014 | Leonardi et al. |
| 2014/0063054 A1 | 3/2014 | Osterhout et al. |
| 2014/0192311 A1 | 7/2014 | Pletcher et al. |
| 2014/0198128 A1 | 7/2014 | Hong et al. |
| 2014/0240655 A1 * | 8/2014 | Pugh ...................... G02C 7/04 351/158 |
| 2014/0240665 A1 | 8/2014 | Pugh et al. |
| 2014/0292620 A1 | 10/2014 | Lapstun et al. |
| 2015/0005604 A1 | 1/2015 | Biederman et al. |
| 2015/0005606 A1 * | 1/2015 | Honore ............. A61B 5/14532 600/365 |
| 2015/0016777 A1 | 1/2015 | Abovitz et al. |
| 2015/0060904 A1 | 3/2015 | Robin et al. |
| 2015/0062533 A1 | 3/2015 | Toner et al. |
| 2015/0088253 A1 | 3/2015 | Doll et al. |
| 2015/0126845 A1 | 5/2015 | Jin et al. |
| 2015/0145095 A1 | 5/2015 | Kim et al. |
| 2015/0150510 A1 | 6/2015 | Leonardi et al. |
| 2015/0171274 A1 | 6/2015 | Guo et al. |

(56) References Cited

U.S. PATENT DOCUMENTS

| | | | |
|---|---|---|---|
| 2015/0183173 A1* | 7/2015 | Linhardt | B29D 11/00807 264/1.7 |
| 2015/0223684 A1 | 8/2015 | Hinton et al. | |
| 2015/0227735 A1 | 8/2015 | Chappell et al. | |
| 2015/0234205 A1 | 8/2015 | Schowengerdt et al. | |
| 2015/0235439 A1 | 8/2015 | Schowengerdt et al. | |
| 2015/0235440 A1 | 8/2015 | Schowengerdt et al. | |
| 2015/0235444 A1 | 8/2015 | Schowengerdt et al. | |
| 2015/0235446 A1 | 8/2015 | Schowengerdt et al. | |
| 2015/0235457 A1 | 8/2015 | Schowengerdt et al. | |
| 2015/0235468 A1 | 8/2015 | Schowengerdt et al. | |
| 2015/0235471 A1 | 8/2015 | Schowengerdt et al. | |
| 2015/0241698 A1 | 8/2015 | Schowengerdt et al. | |
| 2015/0243090 A1 | 8/2015 | Schowengerdt et al. | |
| 2015/0261294 A1 | 9/2015 | Urbach et al. | |
| 2015/0281411 A1 | 10/2015 | Markus et al. | |
| 2015/0301338 A1 | 10/2015 | Van et al. | |
| 2015/0312560 A1 | 10/2015 | Deering | |
| 2015/0339857 A1 | 11/2015 | O'Connor et al. | |
| 2015/0362750 A1 | 12/2015 | Yeager et al. | |
| 2015/0362752 A1 | 12/2015 | Linhardt et al. | |
| 2015/0380461 A1 | 12/2015 | Robin et al. | |
| 2015/0380988 A1 | 12/2015 | Chappell et al. | |
| 2016/0005233 A1* | 1/2016 | Fraccaroli | G02B 27/0172 345/633 |
| 2016/0011419 A1 | 1/2016 | Gao et al. | |
| 2016/0018650 A1 | 1/2016 | Haddick et al. | |
| 2016/0018651 A1 | 1/2016 | Haddick et al. | |
| 2016/0018652 A1 | 1/2016 | Haddick et al. | |
| 2016/0018653 A1 | 1/2016 | Haddick et al. | |
| 2016/0030160 A1 | 2/2016 | Markus et al. | |
| 2016/0049544 A1 | 2/2016 | Robin et al. | |
| 2016/0066825 A1 | 3/2016 | Barrows et al. | |
| 2016/0080855 A1 | 3/2016 | Greenberg et al. | |
| 2016/0091737 A1 | 3/2016 | Kim et al. | |
| 2016/0093666 A1 | 3/2016 | Gilet et al. | |
| 2016/0097940 A1 | 4/2016 | Sako et al. | |
| 2016/0113760 A1 | 4/2016 | Conrad et al. | |
| 2016/0141449 A1 | 5/2016 | Robin et al. | |
| 2016/0141469 A1 | 5/2016 | Robin et al. | |
| 2016/0143728 A1 | 5/2016 | De et al. | |
| 2016/0147301 A1 | 5/2016 | Iwasaki et al. | |
| 2016/0154256 A1 | 6/2016 | Yajima et al. | |
| 2016/0172536 A1 | 6/2016 | Tsai et al. | |
| 2016/0172869 A1 | 6/2016 | Park et al. | |
| 2016/0181852 A1* | 6/2016 | Penttila | H02J 7/0042 320/108 |
| 2016/0204307 A1 | 7/2016 | Robin et al. | |
| 2016/0253831 A1 | 9/2016 | Schwarz et al. | |
| 2016/0261142 A1 | 9/2016 | Park et al. | |
| 2016/0270176 A1 | 9/2016 | Robin et al. | |
| 2016/0270187 A1 | 9/2016 | Robin et al. | |
| 2016/0276328 A1 | 9/2016 | Robin et al. | |
| 2017/0042480 A1 | 2/2017 | Gandhi et al. | |
| 2017/0168322 A1 | 6/2017 | Toner et al. | |
| 2018/0136492 A1* | 5/2018 | An | A61B 5/145 |

FOREIGN PATENT DOCUMENTS

| | | |
|---|---|---|
| WO | WO 2016/022665 | 2/2016 |
| WO | 2016141349 | 9/2016 |
| WO | WO 2016/150630 A1 | 9/2016 |

OTHER PUBLICATIONS

Kim, Y-J. et al., "Eyeglasses-Powered, Contact Lens-Like Platform with High Power Transfer Efficiency," Biomed Microdevices, Springer, Jul. 7, 2015, 9 pages.

Pandey, J. et al., "A Fully Integrated RF-Powered Contact Lens with a Single Element Display," IEEE Transactions on Biomedical Circuits and Systems, Dec. 2010, pp. 454-461, vol. 4, No. 6.

* cited by examiner

UNOBTRUSIVE EYE MOUNTED DISPLAY

CROSS-REFERENCE TO RELATED APPLICATION(S)

This application claims priority under 35 U.S.C. § 119(e) to U.S. Provisional Patent Application Ser. No. 62/427,078, "Unobtrusive Augmented Reality," filed Nov. 28, 2016.

The subject matter of all of the foregoing is incorporated herein by reference in their entirety.

BACKGROUND

1. Technical Field

This disclosure relates generally to an augmented reality system, and more particularly, to an unobtrusive eye mounted augmented reality system.

2. Description of Related Art

Augmented reality (AR) adds computer-generated information to a person's view of the world around them. A common augmented reality platform is a special pair of glasses that displays information while still allowing one to see through them. Unfortunately, current AR glasses are significantly larger and heavier than regular glasses. They make a person wearing them look awkward.

What are needed are augmented reality systems that are so lightweight and easy to use that people want to use them all the time.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1A:
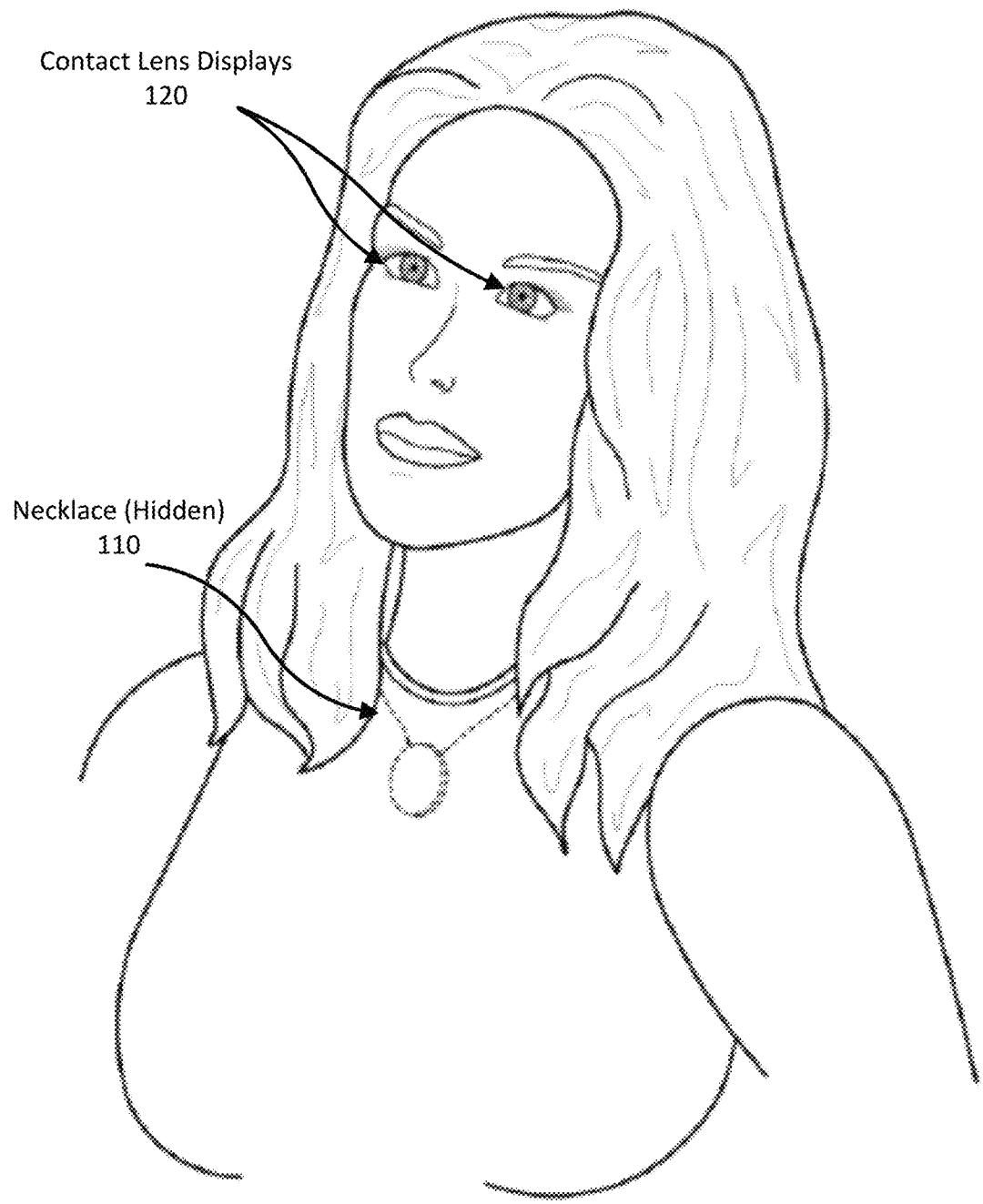
FIG. 1A shows a person wearing an augmented reality system including a hidden necklace.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

An unobtrusive augmented reality system can be used to assist a wearer in every day interactions by projecting information from a contact lens display onto the retina of the wearer's eye. That is, the augmented reality system is comfortable for a person to wear all day long, is difficult for others to see, and is wearable as part of a daily wardrobe. The unobtrusive augmented reality system includes a necklace and a contact lens display that are unobtrusive to the wearer and the wearer's surrounding environment. For example, the augmented reality system can recognize the speech of a person talking using electronics embedded in the necklace. Further, the AR system can project the text of the speech onto the eye of the wearer using the contact lens display.

In one configuration, the necklace of the unobtrusive augmented reality system generates power and data for the contact lens displays. The necklace includes a conductive coil which generates a magnetic field. The contact lens display includes a conductive coil inductively coupled to the conductive coil of the necklace via the magnetic field. The inductive coupling between the necklace and the contact lens allows data and power generated by the necklace to be transmitted (i.e., delivered) to the contact lens display. The contact lens display receives the data and power from the inductively coupled necklace. In other configurations, data and power may be delivered from the necklace to the contact lens display using various other wireless transmission methods.

A projector in the contact lens display projects images generated from the data onto the retina of the wearers eye. In one example, the contact lens display can include a tiny projector—for example a "femtoprojector" as described by Deering in U.S. Pat. No. 8,786,675, "Systems using eye mounted displays". The contact lens may act as a conventional, vision-correcting lens at the same time that it supports a femtoprojector, so there is no need to wear glasses. Advanced systems include multiple femtoprojectors that cover a wide field of view and project images at different resolutions corresponding to the natural resolution of the different parts of the retina at which they are aimed.

Whatever the configuration of the necklace and contact lens display, it is substantially unnoticeable to others. The necklace may include hardware elements such as a rechargeable battery, a radio-frequency modulator, a data modem, a wireless network connection, sensors, a microprocessor and memory, as examples. Further, the system may optionally include wireless or wired earphones that may couple to elements of the necklace. An unobtrusive augmented reality system including a contact lens display and necklace may therefore replace the display of a smartphone. An advanced system may replace all of the capabilities of a smartphone such as voice and text communications, photography, music and video playback, etc.

The unobtrusive augmented reality system described herein provides features and advantages long promised by AR enthusiasts in a form that is natural and does not interfere with daily life.

FIG. 1A shows a person wearing an augmented reality system 100 including a hidden necklace 110. The person is wearing contact lens displays 120 in her eyes, but the displays are as hard to notice as regular contact lenses. Also hard to notice is the necklace 110 hidden under her shirt. Although the person can see computer generated information superimposed on her normal view, other people around her can't tell.

Figure 1B:
FIG. 1B shows a person wearing an augmented reality system including a visible necklace.

FIG. 1B shows a person wearing an augmented reality 100 system including a visible necklace 110. Even though the necklace 110 is in plain sight, it may be designed to look like ordinary jewelry and therefore attracts no special notice. Whether the necklace is hidden (as in FIG. 1A) or disguised (as in FIG. 1B), it does not alter one's impression of the person wearing it. Her appearance other than the addition of the necklace 110 is not affected by the AR system.

Figure 1C:
FIG. 1C shows a person wearing an augmented reality system including a visible necklace, the augmented reality system controlled by an electronic device.

FIG. 1C shows another example of person wearing an augmented reality system 100 including a visible necklace 110. In this example, the augmented reality system includes an electronic device 130 wirelessly coupled to the necklace 110 to facilitate displaying images, reacting to speech, receiving messages, etc. The electronic device 130 provides added computational power to increase the functionality of the augmented reality system 100. In one embodiment, the electronic device 130 is a mobile computing device executing an application that allows the electronic device 130 to wirelessly couple to and interact with the necklace 110.

Figure 1D:
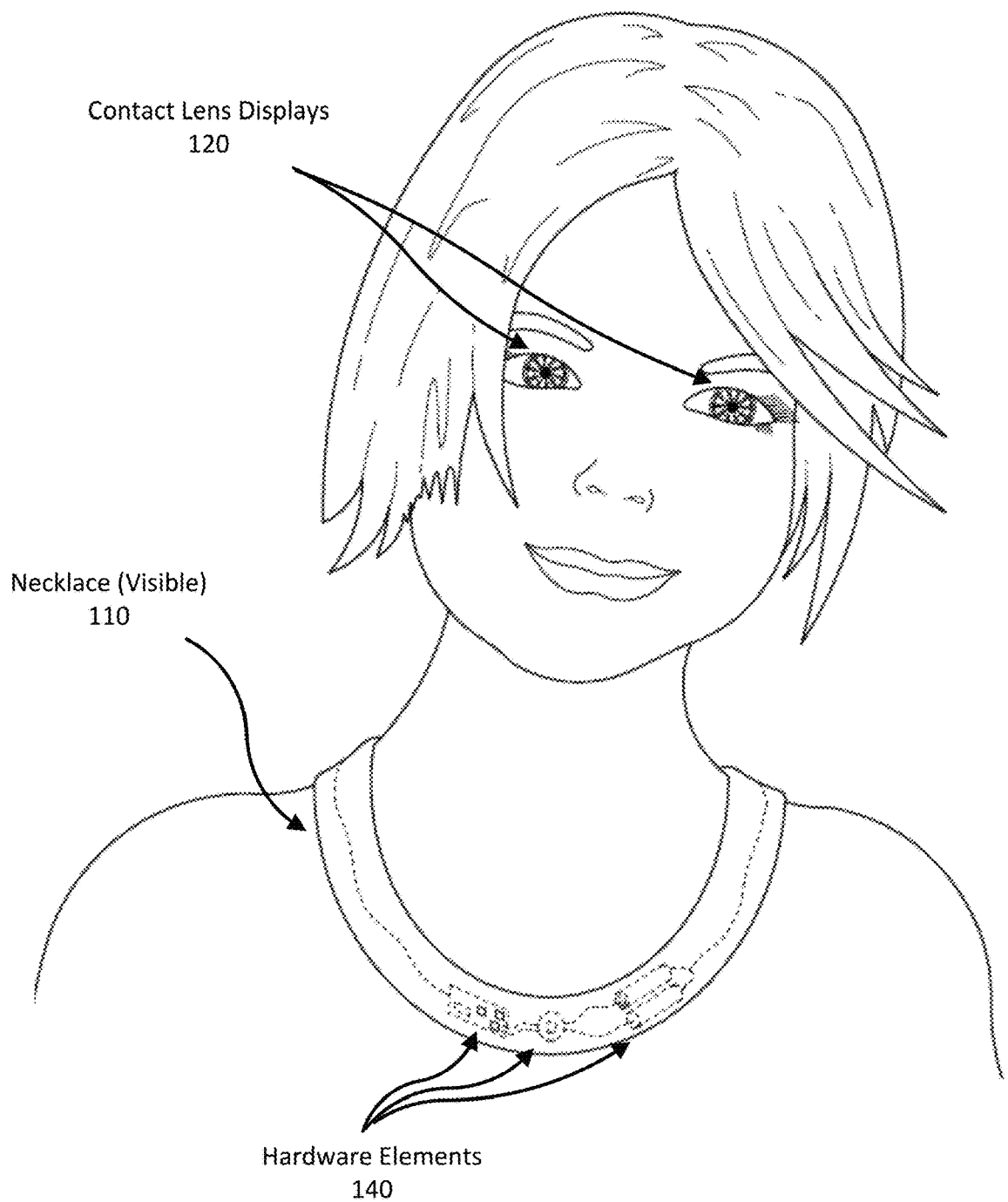
FIG. 1D shows a person wearing an augmented reality system including a visible necklace in which the control electronics for the augmented reality system are distributed throughout the necklace.

FIG. 1D shows an additional example of a person wearing an augmented reality system 100 including a visible necklace 110. In this example, various hardware elements 140 for controlling the augmented reality system are distributed throughout the necklace 100. In the examples of FIGS. 1A-1C the hardware elements 140 are generally localized to a pendant of the necklace. Generally, the pendant may be an ornamental object hanging from the necklace 110 (as seen in FIG. 1A-1C) that is configured to enclose and conceal the hardware elements of the augmented reality system. By contrast, distributing the electronics about the circumference of the necklace allows for a broader range of necklace designs (e.g., without a pendant) suitable to a variety of aesthetic tastes.

Furthermore, the AR system of FIGS. 1A-1D does not disturb the wearer. The contact lens displays 120 may also function as regular contact lenses providing refractive eyesight correction if required. The necklace 110 is lightweight and may not need to be held in one's hand like a cell phone or tablet. The electronic device 130 is similar in size and shape to the electronic devices already used by persons in modern computing environments. When the contact lens displays are not showing images, the wearer is hardly conscious of the AR system. When the system is displaying images, reacting to speech or receiving messages, it provides functions like that of a smartphone but in a more natural way.

While the unobtrusive augmented reality system is illustrated with a necklace 110, in other embodiments the functions of the necklace 110 described herein can be integrated in other types of wearable devices. As an example, the functionality of the necklace can be embedded in a neck tie, a scarf, a belt, the brim of a hat, the collar of a shirt, the hood of a jacket, a headband, earphones, etc. More generally, the functionality of the necklace can be incorporated into any wearable object that is substantially round or may form a loop.

Figure 2A:
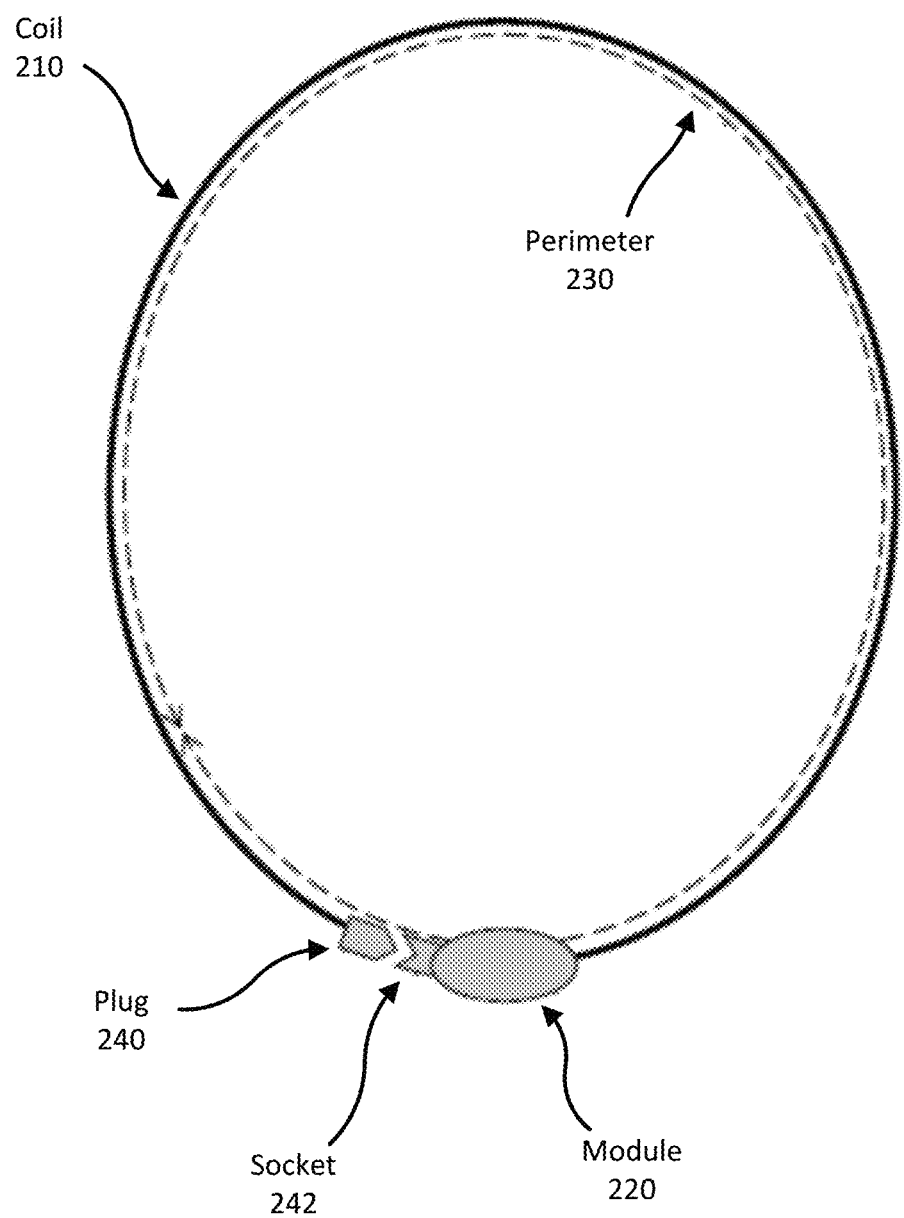
FIG. 2A shows a necklace of an unobtrusive augmented reality system.

FIG. 2A shows a necklace 110 of an unobtrusive augmented reality system. In the illustrated embodiment, the necklace 110 includes a coil 210 of conductive material such as an insulated wire and an electronic module 220. The module 220 contains the various components for controlling the augmented reality system 100. In some configurations the module is within a pendant of the necklace. In other configurations, the necklace 110 does not include a module 220 and the hardware elements 140 are distributed about the perimeter 230 of the necklace as in FIG. 1D. The perimeter 230 of the necklace is preferably between 45 cm and 75 cm and can be less than 150 cm. When the necklace 110 has a curved shape, the perimeter 230 may be the circumference of the necklace 110. Generally, the perimeter of the coils allow for the necklace to be worn comfortably on the human body. Additionally, the number of conductive turns in necklace coil 210 is chosen considering factors such as power requirements of contact lens displays 120, maximum permitted specific absorption rate of radio frequency radiation, operating frequency, etc. For example, when a 60 cm necklace 110 is designed to couple power to a contact lens display 120 at 13.56 MHz, the necklace coil may have exactly one turn. More generally, any unlicensed frequency band can be used to couple the necklace to the contact lens display. For example, the system can use an industrial, scientific, and medical radio band (ISM).

Furthermore, conductors in the coil 210 may extend around the circumference 230 of the necklace 110 for one, two, three, or more turns. These turns may be connected or disconnected with a plug 240 and socket 242 when putting the necklace 110 on or taking it off. Connecting the plug 240 to the socket 242 allows data and power to be transmitted between the necklace 110 and contact lens display 120, and disconnecting the plug 240 from the socket 242 prevents data and power from being transmitted between the necklace 110 and contact lens display 120. Generally, the coil 210 is configured to be worn around a user's neck as a necklace 110 when the plug 240 and socket 242 are connected. In some configurations, the plug 240 and socket 242 can be configured as a 'quick-release' connector. The quick-release connector can allow a user to rapidly break the connection between the plug 240 and socket 242 and cease data and power transmission from the necklace 110 to the contact lens display 120. In some configurations, the necklace 110 may function as part of the AR system 100 without a plug 240 and socket 242. In these cases, the necklace can include other methods of regulating data and power transmission from the necklace to the contact lens (e.g., a switch, a coupled controller, etc.).

In FIG. 2A, the socket 242 is illustrated as being part of the module 220, but a plug 240 and socket 242 may be located anywhere along the circumference 230 of the necklace 110. In alternative configurations, the plug and socket can be any two complementary fasteners that can be removably connected from each other (e.g., coupled and decoupled) and allow for the physical and electrical connection and disconnection of the coil 210. For example the fasteners can be wire connectors, banana plugs, multi-pin wire connectors, etc. In effect, coupling the plug 240 to the socket 242 (i.e. a first fastener to a second fastener) completes the coil 210 and enables the coil 210 to transmit wireless data and power. Conversely decoupling the plug 240 and socket 242 (i.e. a first fastener from the second fastener) breaks the coil 210 and disables the coil 210 from transmitting wireless data and power.

In some configurations, the complementary first fastener and second fastener can be additionally configured into a complementary connectors for opposing ends of the necklace 110. For example, the connectors can be a clasp, a magnetic clasp, a slide lock clasp, a barrel clasp, etc. In other configurations, the complementary connectors may be configured to couple in specific orientations that ensure conduction through the conductive coil when coupled. Whatever their configuration, the first connector and the second connector are configured to couple and decouple opposing ends of the necklace 110.

Figure 2B:
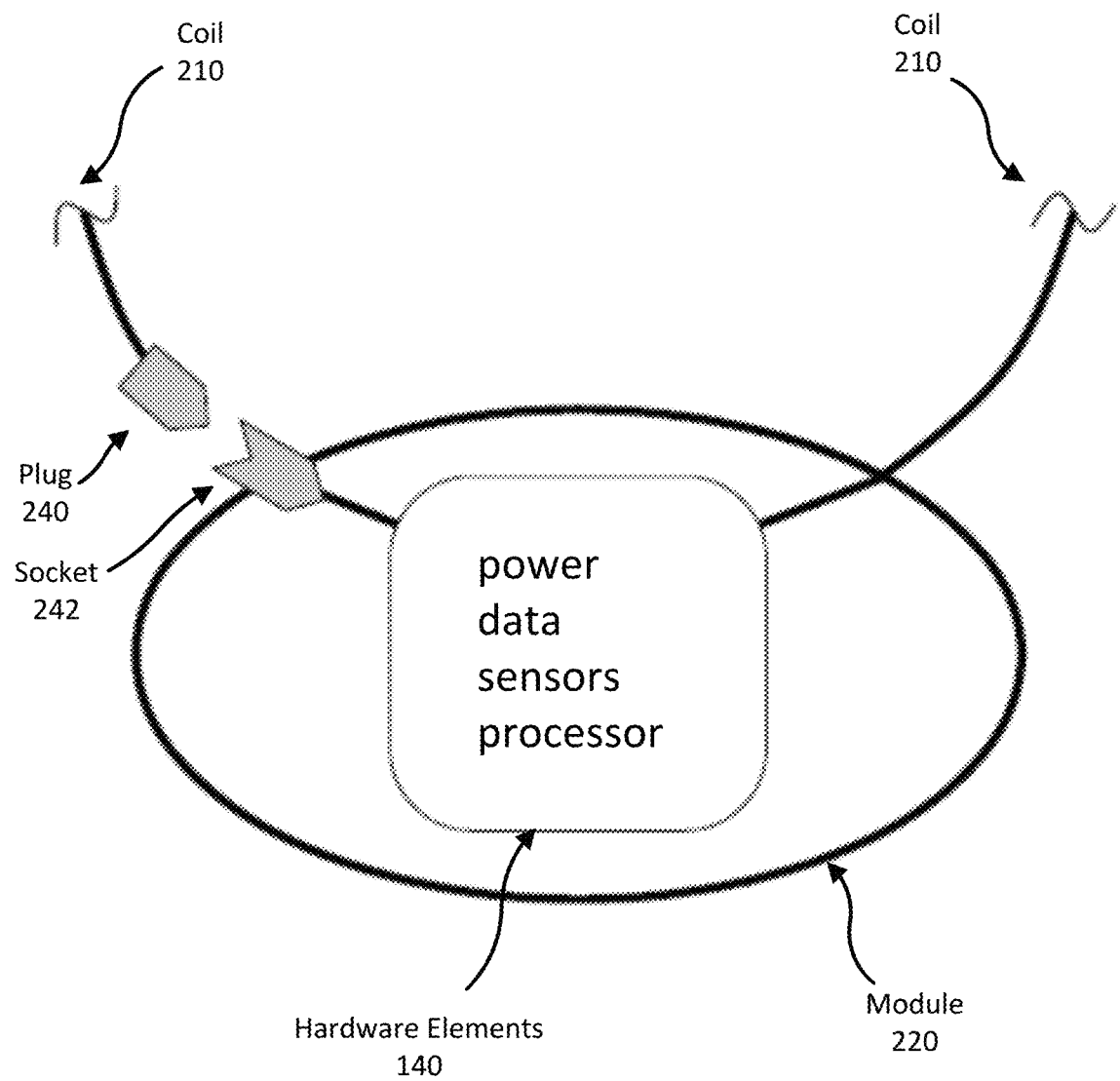
FIG. 2B shows a representation of the control electronics contained within the necklace of an unobtrusive augmented reality system.

FIG. 2B shows a necklace of the augmented reality system such as the necklace of FIGS. 1A-1C. In the illustrated embodiment, the necklace includes a module 220 that may have an exterior appearance of jewelry or a fashion accessory. However, the module 220 may contain additional hardware elements 140 such as: a power source, a battery, etc.; a driver to drive a radio-frequency current onto the necklace coil; a direct current (DC) power supply 278 to drive a direct current (DC) power onto the necklace coil; a protection circuit configured to shut down hardware elements 140 (e.g., amplifier 270, data processor 250, etc.) of the necklace 110 when the necklace coil 210 is decoupled; a data modem (or modulator) to encode data on the radio-frequency signal; sensors such as microphones, cameras, inertial sensors, GPS receivers, barometric pressure sensors, etc.; a cellular radio; a Wi-Fi radio; a Bluetooth radio; a capacitance tuning circuit configured to maintain the necklace at resonance (i.e., as the body moves) and sustain efficient power transfer; a graphics processing unit; and/or, a microprocessor and memory. In some configurations the DC power supply 278 provides DC power while the amplifier 270 provides AC power. In other configurations, the hardware elements 140 included in the module 220 may be distributed about the circumference of the necklace as in FIG. 1D.

When the hardware elements 140 produce a radio-frequency current in the necklace coil 210, power may be coupled into a coil embedded in a contact lens display 120. Each coil may be made resonant at a desired operating frequency with capacitive and/or inductive matching circuits. Data may be transmitted to the contact lens display 120 by modulating the radio-frequency current in the necklace coil 210. Amplitude, frequency and phase modulation are examples of modulation schemes that may be employed. For example in frequency shift keying, a pair of discrete frequencies are used to indicate logical "0" and logical "1". In some configurations, the system 100 can include more than one antenna with each antenna configured to receive either power or data at dissimilar frequencies.

The hardware elements 140 may include a microphone (or multiple microphones) to sense voices and other sounds. The wearer of an unobtrusive augmented reality system 100 may control the system by speaking to it, for example. The system 100 may also include hardware elements such as a speaker and/or wireless connection to earphones. The system 100 may be controlled via a touch sensor in the necklace or via gestures detected by hardware elements 140 including radar (e.g. 60 GHz radar), an outward facing camera, ultrasonic and/or thermal sensors.

Additional hardware elements such as inertial (acceleration and rotation rate) sensors, coupled with a barometric pressure sensor and a GPS receiver may provide position and velocity data to the system 100. Further, a cellular radio and/or Wi-Fi radio hardware element provide connections to voice and/or data networks. Finally, a processor, graphics processing unit and memory run applications and store data. The hardware elements are configured to transmit data and images that display on a contact lens display 120 in a wearer's eyes.

When the AR system 100 is connected to an electronic device 130 as in FIG. 1C, any of the sensors, processors and other components described herein may be located in the electronic device 130. That is, in various configurations, any capabilities of the necklace 110 and contact lens displays 120 may be incorporated into the electronic device 130. Alternatively, the hardware elements 140 of the necklace 110 may connect to an electronic device 130 wirelessly or it may connect physically via a plug-and-socket connector or other type of connector.

Figure 2C:
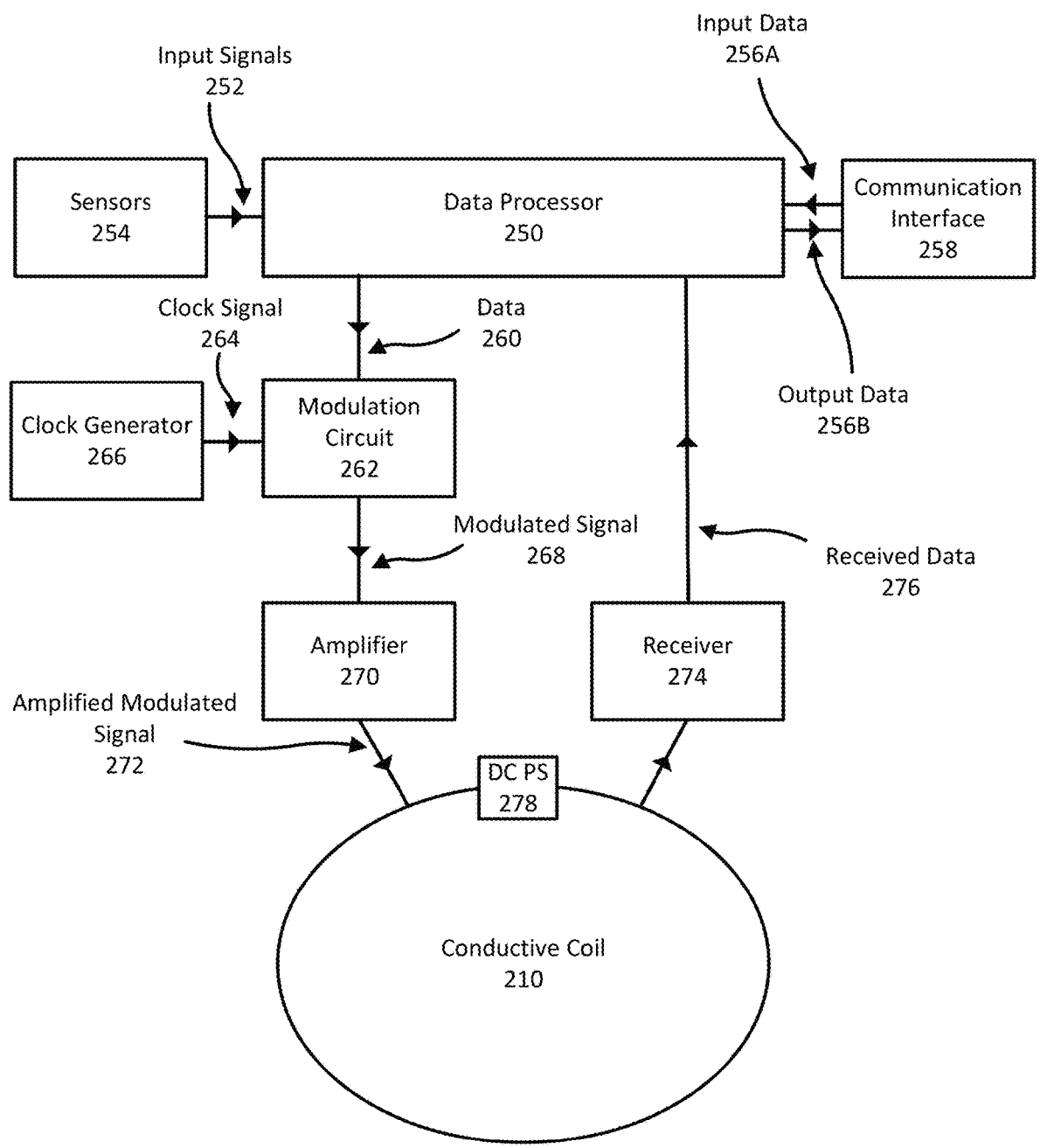
FIG. 2C shows a diagram of the hardware elements and their corresponding signals included in the necklace of an unobtrusive augmented reality system.

FIG. 2C shows a circuit diagram for the hardware elements 140 in a necklace 110, i.e. the necklace 110 of FIGS. 2A-2B, of an unobtrusive augmented reality system 100. The necklace includes a data processor 250 that receives sensor input signals 252 from sensors 254 (e.g. microphone, camera, etc.) and input data 256A from a communication interface circuit 258. In various embodiments, the necklace can include multiple data processors 250 configured to accomplish various functions of the unobtrusive AR system 100 in more complex data processing architectures.

The communication interface circuit 258 communicates data between the necklace 110 and an electronic device 130 (e.g., a smartphone or tablet computer). That is, the necklace 110 is configured to send output data 256B to, and receive input data 256A from, the electronic device 130. The electronic device 130 facilitates processing data that is to be displayed via the contact lens display 120. The data processor 250 processes the received input signals 252 and input data 256, and generates data 260 for display using the contact lens display 120. The data processor 250 outputs the data 260 to the modulation circuit 262.

The modulation circuit 262 receives data 260 from the coupled data processor 250 and clock signals 264 from the clock generator circuit 266. The modulation circuit 262 modulates the clock signal 264 using the data 260 and generates a modulated signal 268. The modulation circuit 262 can use amplitude, frequency and phase modulation schemes to generate the modulated signal 268. The modulation circuit 262 outputs the modulated signal 268 to the amplifier 270.

The amplifier 270 receives the modulated signal 268 from the coupled modulation circuit and amplifies the modulated signal to generate an amplified modulated signal 272. Amplifying the signal increases the power of the signal. The amplifier 270 can amplify the signal linearly or non-linearly and can amplify the voltage, current, or spectral power of the modulated signal 268. The amplifier 270 outputs the amplified modulated signal 272 to the conductive coil 210.

The conductive coil 210 receives the amplified modulated signal 272 from the coupled amplifier 270 and converts the signal 272 into a magnetic field. The magnetic field is provided to the contact lens through inductive coupling, and may provide both wireless data transfer and wireless power to the contact lens. The number of turns in the conductive coil 210 can be selected to influence performance (e.g., operating frequency, coupling efficiency, etc.) of the hardware elements 140 in the necklace 110. Additionally, the conductive coil 210 can receive signals from the contact lens display 120 and transmit those signals to a receiver.

Generally, the necklace 110 and the contact lens display 120 transmit data and power at a frequency which allows for easily maintained inductive coupling. Similarly, the necklace 110 and contact lens display 120 are configured such inductive coupling is easily maintained at typical separations between a necklace and a contact lens. In other configurations, the power and data may be transmitted from the necklace 110 to the contact lens display 120 at different frequencies or by using different methods.

The receiver 274 receives a signal from the conductive coil 210 and converts the received signal into received data 276. In one example, converting a received signal into received data involves determining changes in the impedance of the conductive coil 210 and converting the impedance changes into received data 276.

Effectively, the hardware elements 140 of the necklace 110 act as a primary circuit of an inductive wireless transfer system. The primary circuit may resonate (or, more generally, operate) at a first frequency and can wirelessly transfer power and data to a secondary circuit magnetically coupled to the primary circuit and also resonating at the first frequency. Additionally, the primary circuit can receive data from the secondary circuit in a similar manner. Generally, the contact lens display 120 acts as the secondary circuit.

Figure 3A:
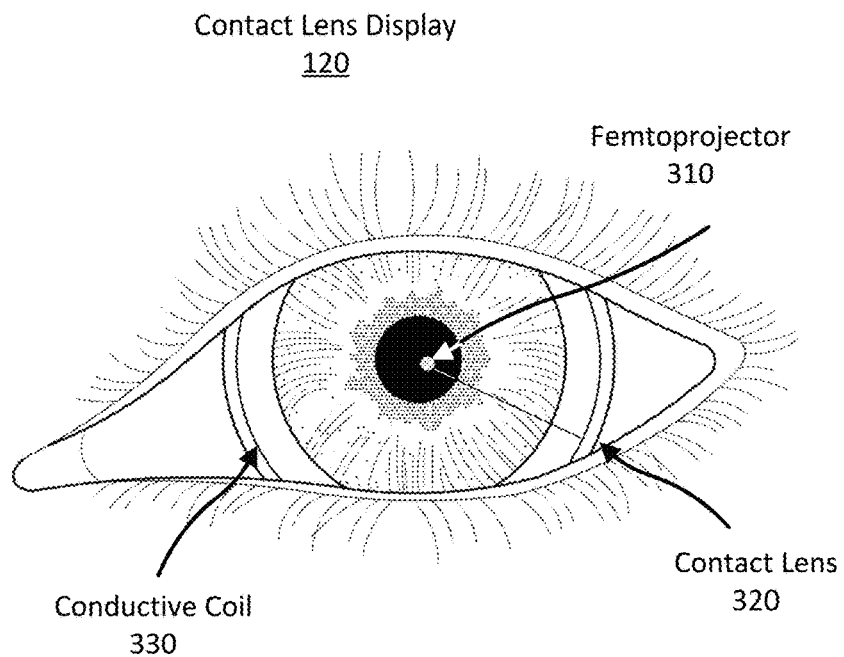
FIG. 3A shows a plan view of a contact lens display mounted on a person's eye.

Continuing, FIG. 3A shows a contact lens display 120 mounted on a person's eye. The contact lens display 120 includes a femtoprojector 310 mounted in a contact lens 320, and a conductive coil 330 near the edge of the contact lens 320 for receiving power and data wirelessly from the necklace 110 as in FIGS. 2A-2C. The femtoprojector 310 may include electronics for recovering power from the conductive coil 330 in the contact lens 320, processing data transmitted to the contact lens 320, and driving a light source inside the femtoprojector 310. The femtoprojector 310 produces images on a wearer's retina. The images are projected with a spatial resolution that may substantially match (or, in some cases, may not match) the resolution of retinal midget ganglion cells in the area of the retina to which the femtoprojector 310 is aimed. The natural resolution of a retina is greatest at the fovea and decreases according to the functional form $-\log(\tan(\theta/2))$ where $\theta$ is the visual eccentricity.

Figure 3B:
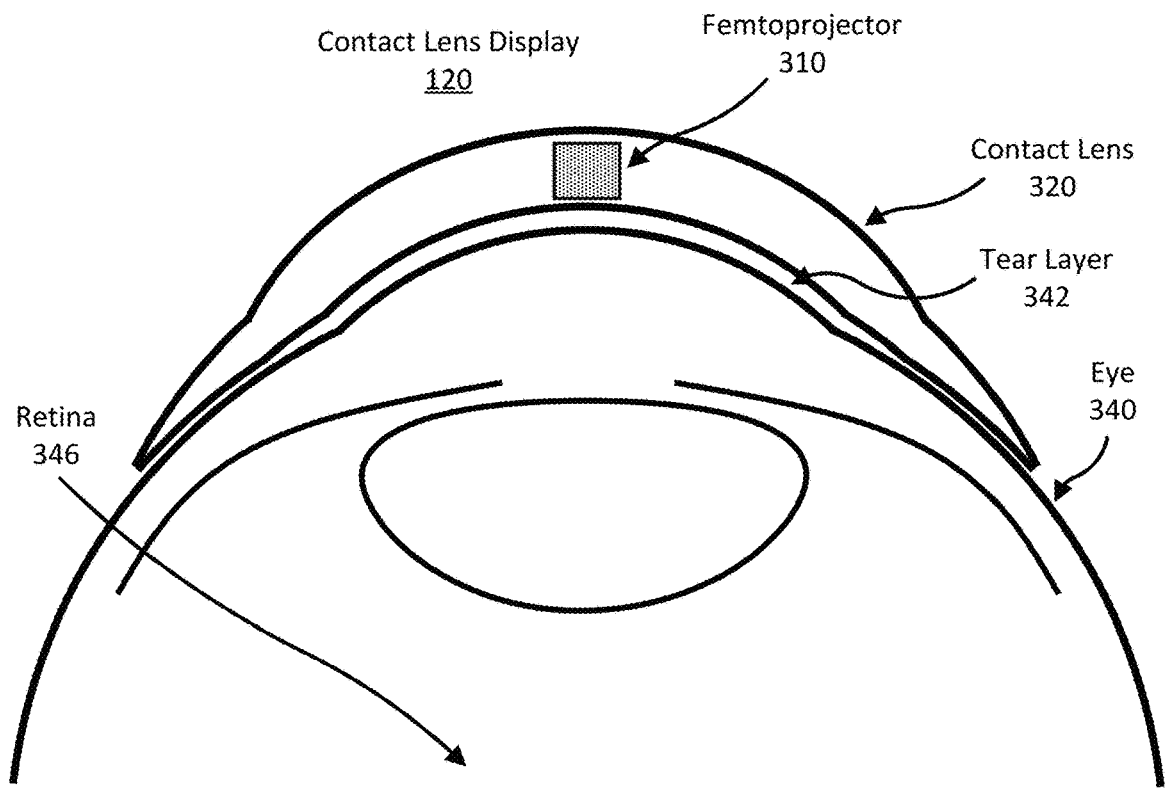
FIG. 3B shows a cross sectional view of a contact lens display mounted on a person's eye.

FIG. 3B shows a cross sectional view of a contact lens display 120 containing a femtoprojector 310 in a contact lens 320. FIG. 3B shows an embodiment using a scleral contact lens but the contact lens does not have to be scleral. The contact lens 320 is separated from the cornea of the user's eye 340 by a tear layer 342. The contact lens display 120 has an outer surface facing away from the eye 340 and an inner surface contacting the tear layer 342. Generally, the femtoprojector 310 is positioned between the front surface and the back surface and projects images onto the wearer's retina 346. The contact lens 320 preferably has a thickness that is less than two mm, and the femtoprojector 310 preferably fits in a 2 mm by 2 mm by 2 mm volume. The contact lens 320 is comfortable to wear and maintains eye health by permitting oxygen to reach the user's eye 340. In some configurations the contact lens 320 is a scleral contact lens, but in other configurations the contact lens is a soft contact lens.

Figure 3C:
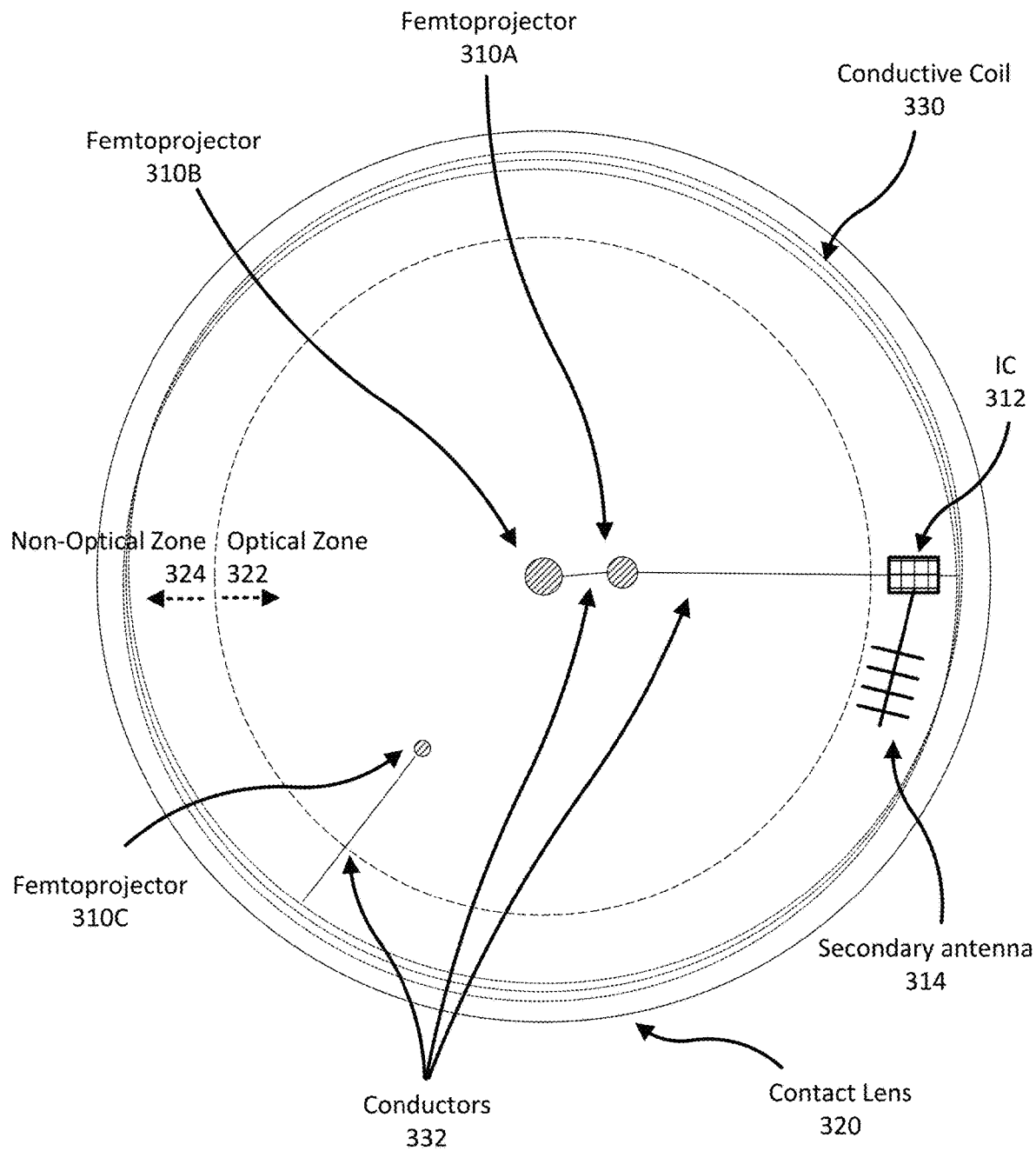
FIG. 3C shows a plan view of the contact lens display of FIG. 3A in more detail.

FIG. 3C shows the contact lens display 120 of FIG. 3A in more detail. FIG. 3C shows a top view of a contact lens display 120 with multiple femtoprojectors 310A-C in a contact lens 320. The conductive coil 330 in the contact lens 320 may have between about between 1 and 20 turns arranged in a spiral. In other configurations, the conductive coil can be arranged in a cylindrical coil or any other looped shape. It is connected to the femtoprojector and other electronics via embedded conductors 332. The femtoprojector 310, conductive coil 330 and electronics are enclosed in lens material such that the lens feels to a wearer like a conventional contact lens. The contact lens 320 is between about 6 mm and about 25 mm in diameter and preferably between about 8 mm and about 18 mm in diameter. In other configurations, the contact lens 320 may be any other curved shape (e.g., an oval).

The ratio of the contact lens 320 diameter to femtoprojector 310 lateral size is roughly 25:1 for the largest femtoprojector. This ratio is normally between about 15:1 and 30:1, but may be as small as 5:1 or as large as 50:1. FIG. 3C shows three femtoprojectors 310A-C in the contact lens 320, but many femtoprojectors, or only one, may be mounted in such a lens 320. Eye-mounted displays 120 with as many as 49 femtoprojectors in a contact lens 320 have been proposed. If there is only one femtoprojector 310 in a contact lens 320, it need not be in the center of the lens.

The femtoprojectors 310 in FIG. 3C are also shown as different sizes. The entire display, made up of all the femtoprojectors, may be a variable resolution display that generates the resolution appropriate for each region of the eye, vastly reducing the total number of individual "display pixels" required compared to displays of equal resolution and field of view that are not eye-mounted. For example, a 400,000 pixel eye-mounted display using variable resolution can cover the same field of view as a fixed external display containing tens of millions of discrete pixels.

In FIG. 3C, the contact lens 320 is roughly divided by the dashed circle into an optical zone 322 and a non-optical zone 324. Components in the optical zone 322 may be in the optical path of the eye, depending on how far open the iris is. Components in the non-optical zone 324 fall outside the aperture of the eye. Accordingly, light-emitting optical elements are generally positioned in the optical zone and non-light-emitting optical elements are positioned in the non-optical zone. For example, femtoprojectors 310 are within the optical zone 322. Additionally, the contact lens may also contain other components positioned in the non-optical zone 322 for data processing, data transmission, environment sensing, and power and/or positioning. These components are represented in FIG. 3C as an integrated circuit (IC) 312 coupled to the femtoprojectors 310 and conductive coil 330. In some embodiments, any or all of the functionality of the IC 312 may be included in the femtoprojectors 310.

As a general example, data transmission components may include antennae or optical/infrared photodetectors, ultrasound detectors, data storage and buffering, controls, and possibly also on-lens processing. Power components may include coils for power transmission and batteries or capacitors for power storage. Environment sensing components may include accelerometers, cameras, microphones, etc. Positioning components on the contact lens 320 may include accelerometers, magnetometers, gyroscopes, cameras or other components capable of giving positional information. Further the positioning components can include fiducial or other structures used for eye tracking and head tracking that operate in conjunction with components external the contact lens 320. Data processing components can include a microprocessor or other data processing elements.

There are many ways in which this functionality can be configured with an eye-mounted display(s) to create embodiments of eye-mounted display systems. Portions of these subsystems may be external to the user, while other portions may be worn by the user in the form of a headpiece or glasses. Components may also be worn on a belt, armband, wrist piece, necklace or other types of packs.

FIG. 3C also shows a secondary antenna 314 coupled to the IC 312. The secondary antenna 314 can be any antenna that allows components of the contact lens 320 to receive data or power in a method other than inductive coupling to the necklace 110. For example, the secondary antenna 314 can be configured to receive data from the electronic device 130 via Bluetooth.

Figure 3D:
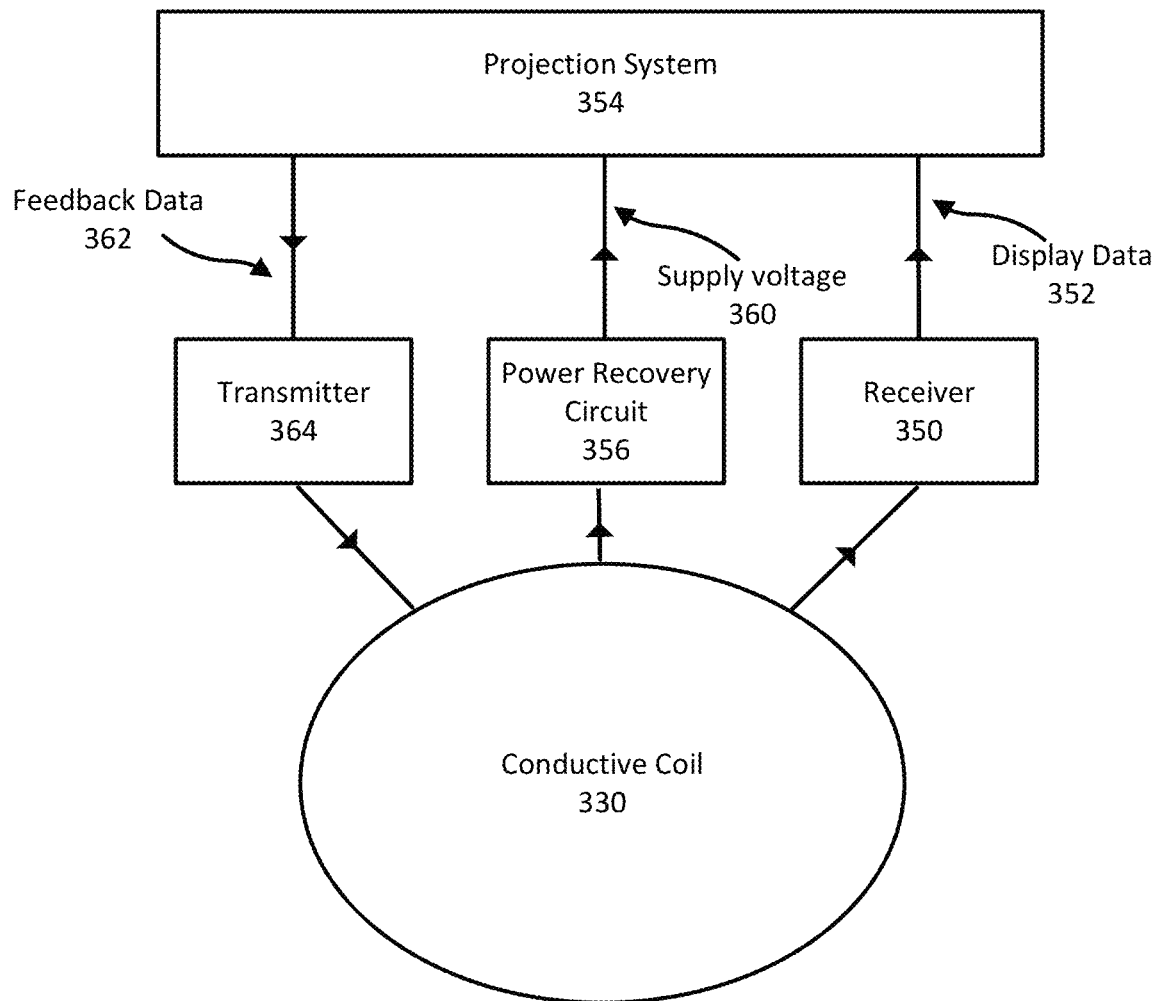
FIG. 3D shows a diagram of the hardware elements and their corresponding signals included in the contact lens display of an unobtrusive augmented reality system.

FIG. 3D shows a circuit diagram for the hardware elements in a contact lens display 120 (e.g., the contact lens display of FIGS. 3A-3C) of an unobtrusive augmented reality system 100. The contact lens display 120 includes a conductive coil 330. The number of turns in the conductive coil 330 can be selected to influence performance of the contact lens display 120. The conductive coil 330 is inductively coupled to the conductive coil 210 of the necklace 110 and receives a portion of the magnetic field generated from the conductive coil 210. The magnetic field can transfer both wireless power and wireless data that may be received by the conductive coil 330. The conductive coil 330 converts this magnetic field into electric current.

The receiver 350 receives a signal from the conductive coil 330 and demodulates it into display data 352 (or any other type of data). The display data 352 is transmitted to the projection system 354.

Additionally, the conductive coil 330 is coupled to a power recovery circuit 356. The power recovery circuit 356 recovers power from the conductive coil 330 and generates a supply voltage 360 from the recovered power. The inductive coupling between the necklace 110 and the contact lens display 120 allows power to be transferred via an induced magnetic field between the conductive coil 210 of the necklace 110 and the conductive coil 330 of the contact lens display 120. The power recovery circuit 356 receives this power and generates a supply voltage 360 that is used to power the projection system 354 and other electronics and sensors of the contact lens 320. In some cases, the functionality of the power recovery circuit 356 can be included in the receiver 350. In one embodiment, the contact lens display 120 can include a rectifier circuit that rectifies the signal received from the necklace 110. In this configuration, the power recovery circuit 356 and the receiver 350 can receive the rectified signal. In one embodiment, the power recovery circuit 356 is a power converter that converts input power from the conductive coil 330 into output power.

The projection system 354 receives display data 352 from the receiver 350 and the supply voltage 360 from the power recovery circuit 356 and displays images onto the eye of the user via the femtoprojector(s) 310. In some cases, the projection system 354 additionally includes data processing elements that process the display data 352 such that it can be displayed as images by the femtoprojector 310.

Additionally, the projection system 354 generates feedback data 362 describing operation of the projection system 354. Further, in some example configurations, sensors included in the contact lens 320 generate feedback data 362 describing conditions sensed by the sensors for transmission to the necklace 110. The feedback data 362 is transmitted to the transmitter 364. The transmitter 364 receives feedback data 362 from the projection system 354 and performs impedance modulation across the conductive coil 330 based on the feedback data 362. Accordingly, the transmitter 364 changes the impedance across the conductive coil 330 such that the feedback data 362 can be detected by the necklace 110 via detection of the impedance changes.

In one embodiment, the transmitter 364 functions as a backscatter circuit. That is, the transmitter 364 modulates the impedance across the conductive coil by shorting the conductive coil 330. Shorting the conductive coil changes the backscatter of the contact lens display 120 (i.e., reflection of waves transmitted to the contact lens display 120 by the necklace 110). The modulated backscatter of the contact lens display 120 can, subsequently, be received by the inductively coupled necklace 110 and affect the voltage seen across the coil 210 of the necklace 110. The receiver circuit 274 of the necklace 110 then recovers the feedback data from the voltage across the conductive coil 210.

Effectively, the hardware elements of the contact lens display 120 act as a secondary circuit of an inductive wireless transfer system. The secondary circuit resonates at the frequency of the primary circuit and can wirelessly receive power and data from a magnetically coupled primary circuit. Additionally, the secondary circuit can transmit data to the primary circuit. Generally, the necklace 110 acts as the primary circuit while the contact lens display acts 120 as the secondary circuit.

Figure 4A:
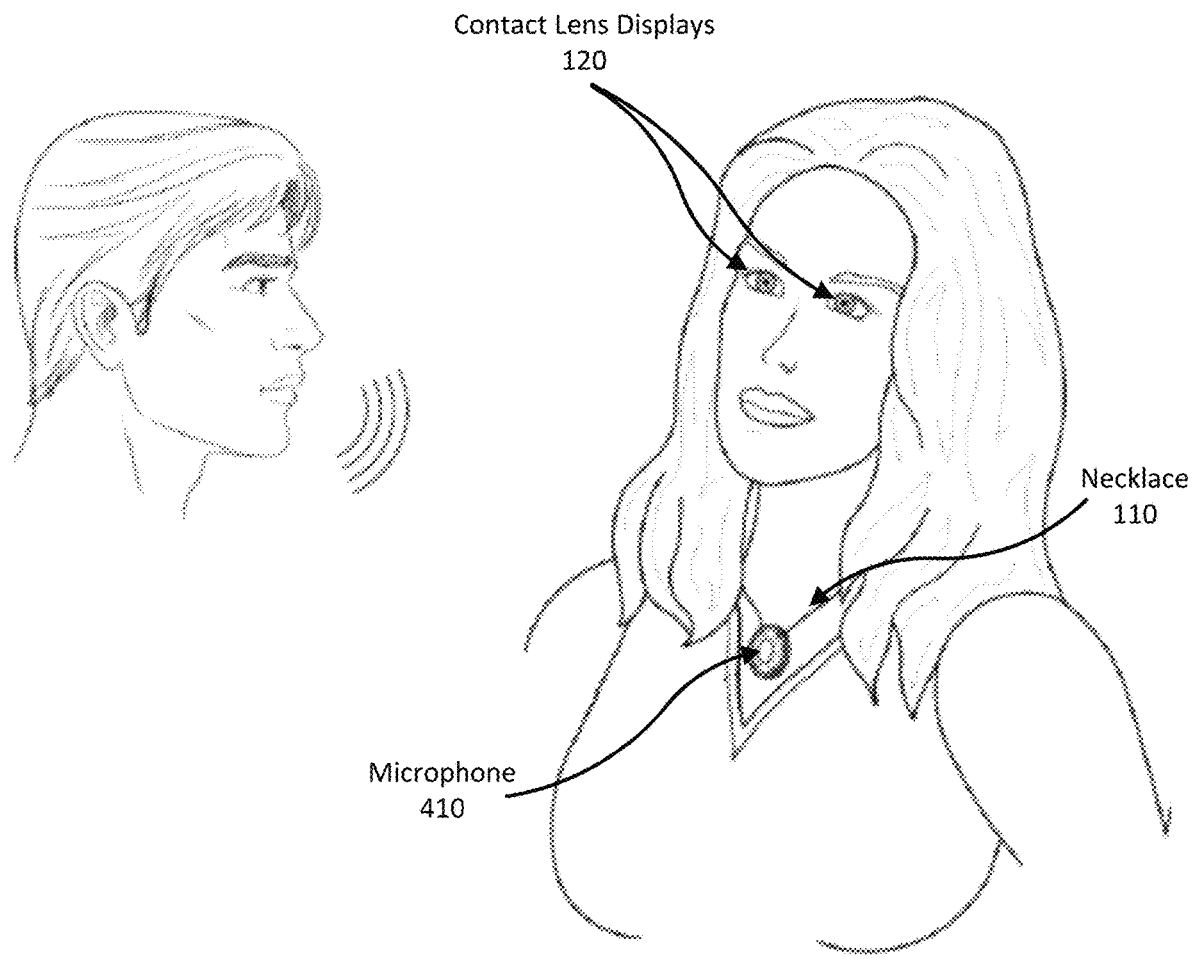
FIG. 4A shows a person speaking to another person who is wearing an augmented reality system.
Figure 4B:
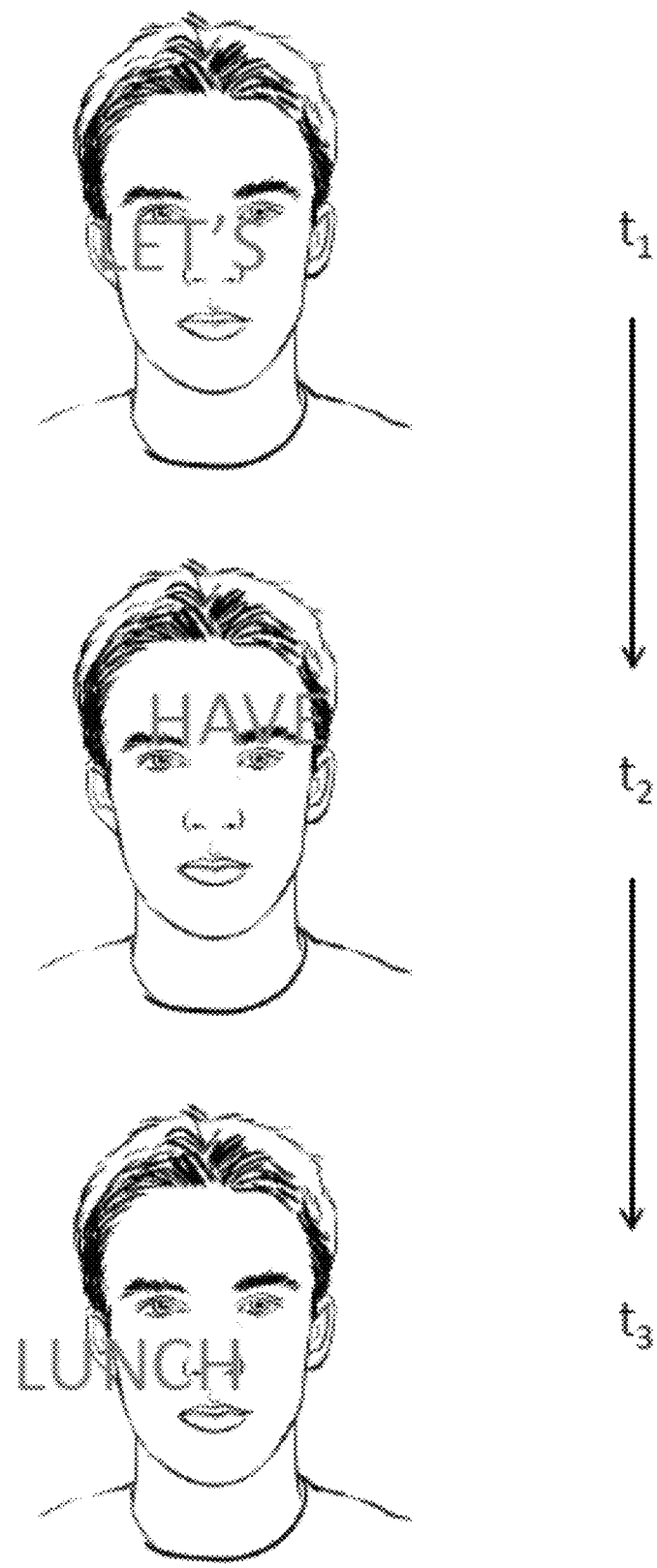
FIG. 4B shows a first series of views as seen by a person wearing an augmented reality system.
Figure 4C:
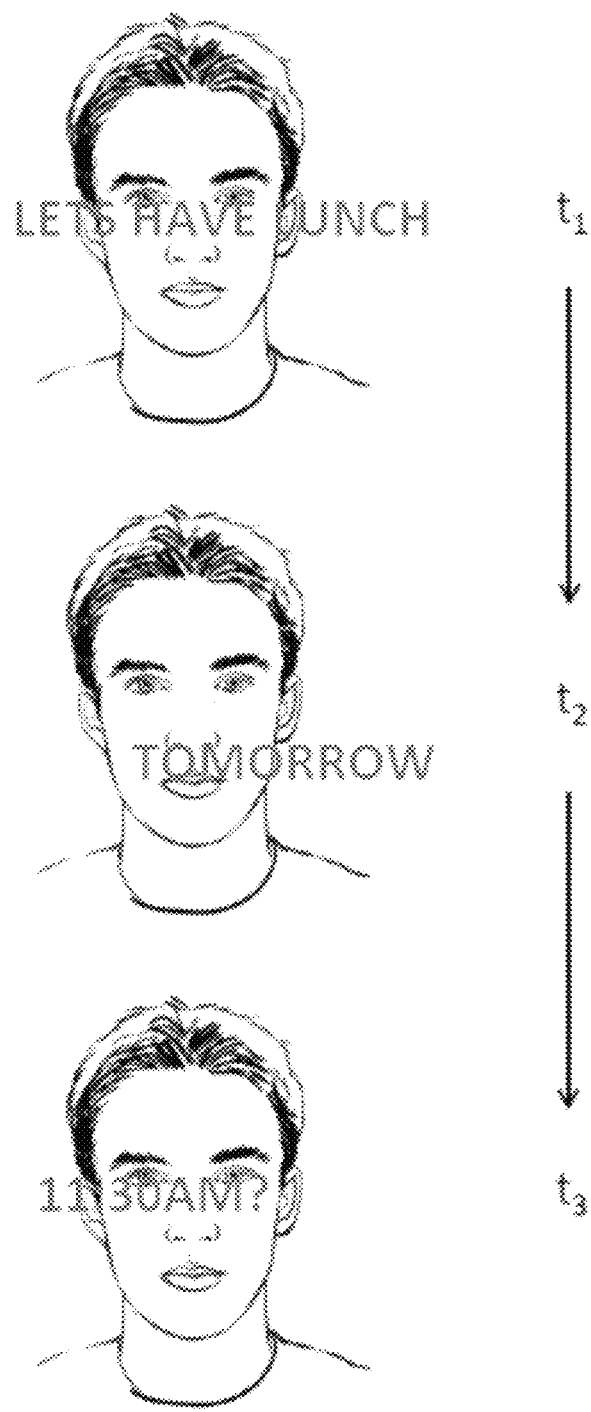
FIG. 4C shows a second series of views as seen by a person wearing an augmented reality system.

Applications of an unobtrusive augmented reality system include all applications contemplated for eyeglasses-type AR. FIGS. 4A-4C illustrate applications that are suited for deaf people, people travelling in foreign countries, or people who have forgotten an interlocutor's name.

FIG. 4A shows a person speaking to another person who is wearing an augmented reality system. The man's voice is detected by a microphone 410 of the necklace 110 (or by the electronic device 130) of the woman's unobtrusive augmented reality system. That is, microphone 410 (or an array of microphones) receives sound from the man's voice and converts the sound into an audio frequency electrical signal (e.g., input signal 252) of the man's voice. The woman may be deaf, or she may not understand the language spoken by the man, or she may have forgotten his name. In the first two cases, a processor 250 in the necklace module recognizes speech in the audio signal of the man's voice and transmits data to the contact lens display 120 that causes the contact lens display 120 to display what he is saying as text in the woman's field of view. The text may be in the original language, or translated into another language that the woman understands. In speaker identification mode, the processor 250 records a sample of the man's voice and compares it against a database of voice samples to determine what his name is. Thus, the necklace determines the source of the audio signal and transmits data to the contact lens display 120 that causes the contact lens display 120 to display text identifying the source of the audio signal in one or more images displayed by the contact lens display 120. The database and associated voice matching operations may be performed by a server in the cloud.

FIG. 4B shows a series of views of what the woman sees. As the man speaks, and as time progresses from $t_1$ to $t_2$ to $t_3$, the woman sees "LET'S", "HAVE", and "LUNCH", superimposed on the man's face or wherever she happens to be looking. (In the figure the words are shown in different positions near the man's face to indicate that the woman's gaze shifts.) In this way, she can see what he is saying while looking directly at him, just as she would in normal conversation. From the man's point of view, the woman understands what he is saying, without any visible assistance despite hearing loss or not understanding his language.

The text is presented to the woman in her field of vision in a low duty-cycle, rapid serial presentation. She does not need to scan laterally to read a sentence. Many people can understand text presented in this way at a rate of 10 words per second or more. When the man stops talking the display becomes clear, as if it were no longer there. When used for language translation the effect is similar to a subtitles on a movie, which many people are used to and find acceptable or normal. The text may be color coded or presented in different fonts to indicate different people speaking. In speaker identification mode the man's name is presented in the woman's field of view.

FIG. 4C shows an alternate implementation of series of views of what the woman sees. As the man speaks, and as time progresses from $t_1$ to $t_2$ to $t_3$, the woman sees "LET'S HAVE LUNCH", "TOMORROW", and "11:30 AM?", superimposed on the man's face or wherever she happens to be looking. In this example, groups of words are presented serially rather than single words at a time. Many people can still understand normal speech patterns presented in this way.

In an implementation similar to FIGS. 4A-4C, the unobtrusive AR system 100 may be configured to interpret manual communication and display text corresponding to the manual communication to the wearer of the contact lens display. For example, images of a person's manual communication (e.g., American Sign Language) are captured by a camera of the necklace 110 (or by the electronic device 130) of a person wearing the augmented reality system 100. The processor 250 receives images of the manual communication and interprets the manual communication and converts it into data describing the text represented by the manual communication using a machine learning model. The system 100 transmits the data to the contact lens display 120 which causes the contact lens display 120 to display text of what is being communicated with the manual communication in the wearer's field of view.

An augmented reality system based on a contact lens display and a necklace as described herein is unobtrusive to others and also to its own wearer. It can be worn all day and replaces many functions of smartphones and tablet computers and/or their conventional displays.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

FIGS. 2C and 3D may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although the unobtrusive augmented reality system as shown in the figures has a limited number of elements in a certain topology, it may be appreciated that the necklace 110 of FIG. 2C and the contact lens display of FIG. 2D, may include more or fewer elements in alternate topologies as desired for a given implementation. The embodiments are not limited in this context.

Depending on the form of the elements, the "coupling" between elements may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. An augmented reality system comprising:
    a contact lens display capable of projecting one or more images onto a user's retina; and
    a necklace to deliver power to the contact lens display wirelessly using inductive coupling via a first conductive coil extended along a perimeter of the necklace;
    wherein the contact lens display comprises:
        a second conductive coil to inductively couple to the first conductive coil to receive the power wirelessly,
        a transmitter circuit to transmit data wirelessly to the necklace by changing an impedance across the second conductive coil, and
        wherein the necklace further comprises a receiver circuit to receive the data by sensing the change in impedance across the second conductive coil.

2. The system of claim 1, wherein the contact lens display is configured to receive image data wirelessly and project one or more images based on the image data.

3. The system of claim 2, wherein the necklace is configured to transmit the image data to the contact lens wirelessly via the first conductive coil.

4. The system of claim 1, wherein the contact lens display includes an inner surface and an outer surface and a projector between the inner surface and the outer surface.

5. The system of claim 1, wherein the contact lens display further comprises:
    power recovery electronics to receive the power from the second conductive coil.

6. The system of claim 1, wherein the first conductive coil includes a plurality of turns.

7. The system of claim 1, wherein the power is transmitted at a frequency of an industrial, scientific, and medical (ISM) radio band.

8. The system of claim 1, wherein the necklace is capable of transmitting the power wirelessly while hidden under clothing of a wearer of the necklace.

9. The system of claim 1, wherein the necklace is less than 150 cm in circumference.

10. The system of claim 1, wherein the first conductive coil is configured to be worn around a neck of a wearer of the necklace.

11. The system of claim 1, wherein the necklace further comprises a first fastener and a second fastener, the first fastener adapted to removably couple to the second fastener, and the delivery of power enabled when the first fastener is coupled to the second fastener and being disabled when the first fastener is decoupled from the second fastener.

12. The system of claim 11, wherein coupling the first fastener to the second fastener completes the first conductive coil such that power can be delivered and decoupling the first fastener and the second fastener breaks the first conductive coil such that power cannot be delivered.

13. The system of claim 11, wherein the necklace further comprises:
   a direct current (DC) power supply to provide a DC power to the first conductive coil; and
   a protection circuit configured to disable components of the necklace when the first fastener is decoupled from the second fastener.

14. The system of claim 11, wherein the first fastener and the second fastener are configured as a clasp of opposing ends of the necklace.

15. The system of claim 1, wherein the necklace includes a pendant comprising hardware elements configured for delivering power via the first conductive coil.

16. The system of claim 1 wherein the system further comprises a microphone and a processor, the processor configured to:
   receive an audio signal from the microphone;
   recognize speech in the audio signal; and
   generate data representing text of the speech for transmission to the contact lens display such that the contact lens display includes the text of the speech in the one or more images.

17. An augmented reality system comprising:
   a contact lens display capable of projecting one or more images onto a user's retina;
   a necklace to deliver power to the contact lens display wirelessly using inductive coupling via a conductive coil extended along a perimeter of the necklace;
   a microphone; and
   a processor, the processor configured to:
      receive an audio signal from the microphone;
      determine a source of the audio signal; and
      generate data identifying the source of the audio signal for transmission to the contact lens display such that the contact lens display includes text identifying the source of the audio signal in the one or more images.

18. An augmented reality system comprising:
   a contact lens display capable of projecting one or more images onto a user's retina;
   a necklace to deliver power to the contact lens display wirelessly using inductive coupling via a conductive coil extended along a perimeter of the necklace;
   a microphone; and
   a processor, the processor configured to:
      receive an audio signal from the microphone;
      recognize speech in a first language in the audio signal; and,
      generate data representing text of the speech in a second language different than the first language for transmission to the contact lens display such that the contact lens display includes, in the one or more images, the text of the speech in the second language different than the first language.

19. The system of claim 1 wherein the system further comprises a camera and a processor, the processor configured to:
   receive one or more captured images from the camera;
   recognize manual communication in the one or more captured images; and
   generate data representing text of the manual communication for transmission to the contact lens display such that the contact lens display includes the text of the manual communication in the one or more images.

20. The system of claim 1, wherein the necklace comprises a communication interface for communicating with a mobile computing device, the necklace configured to communicate data with the mobile computing device via the communication interface and to communicate the data wirelessly with the contact lens display.

21. The system of claim 1, wherein the contact lens display comprises a scleral contact lens.

22. An augmented reality system comprising:
   a contact lens display; and
   a necklace to deliver first data to the contact lens display wirelessly using inductive coupling via a first conductive coil extended along a perimeter of the necklace, the contact lens display capable of projecting one or more images onto a user's retina based on the first data;
   wherein the contact lens display comprises:
      a second conductive coil to inductively couple to the first conductive coil to receive the first data wirelessly,
      a transmitter circuit to transmit second data wirelessly to the necklace by changing an impedance across the second conductive coil, and
      wherein the necklace further comprises a receiver circuit to receive the second data by sensing the change in impedance across the second conductive coil.

23. The system of claim 22 wherein the contact lens display includes an inner surface and an outer surface and a projector between the inner surface and the outer surface.

* * * * *